United States Patent [19]
Johnson

[11] Patent Number: 4,930,343
[45] Date of Patent: Jun. 5, 1990

[54] APPARATUS FOR MEASURING AND CONTROLLING FLUID FLOW ACROSS A BOUNDARY

[75] Inventor: Jeffrey C. Johnson, Birmingham, Mich.

[73] Assignee: Haden, Inc., Madison Heights, Mich.

[21] Appl. No.: 329,344

[22] Filed: Mar. 27, 1989

[51] Int. Cl.[5] .................... G01F 1/34; G01F 1/68
[52] U.S. Cl. ..................... 73/196; 73/198; 73/204.22; 73/861.52
[58] Field of Search ............. 73/195, 196, 198, 202, 73/202.5, 204.21, 204.22, 204.27, 861, 861.52, 861.65, 716, 753, 755, 861.42

[56] References Cited

U.S. PATENT DOCUMENTS

| | | | |
|---|---|---|---|
| 3,312,106 | 4/1967 | Davis | 73/861.42 |
| 3,422,682 | 1/1969 | Evans et al. | 73/861.65 |
| 3,613,448 | 10/1971 | Benson et al. | 73/204.21 |
| 3,691,830 | 9/1972 | Tomota et al. | 73/861.22 |
| 4,163,390 | 8/1979 | Rodder | 73/204.27 |
| 4,706,492 | 11/1987 | Jones, Jr. | 73/196 |
| 4,823,591 | 4/1989 | Lewis | 73/3 |

Primary Examiner—Herbert Goldstein
Attorney, Agent, or Firm—Niro, Scavone, Haller & Niro, Ltd.

[57] ABSTRACT

An apparatus for use in measuring fluid flow across a boundary is disclosed including a conduit, supply means for control fluid and two fluid flow sensors. The conduit is positioned to extend across the boundary so that its open ends are located on opposite sides of the boundary. The supply means introduces control fluid at an intermediate point so that control fluid flows through the conduit in opposite directions and discharges through both open ends. The fluid flow sensors are mounted so that each may sense variations in control fluid flow exiting at the ends of the conduit. These sensors generate output signals responsive to fluid flow across the boundary.

5 Claims, 2 Drawing Sheets

APPARATUS FOR MEASURING AND CONTROLLING FLUID FLOW ACROSS A BOUNDARY

BACKGROUND OF THE INVENTION

The present invention relates to apparatus for use in measuring and controlling fluid flow across a boundary. More particularly, the present invention relates to an apparatus useful in balancing or controlling air flows between different regions separated by partitions having air flow passageways. The invention finds advantageous application, for example, in the balancing of air flow into or out of spraybooths used in commercial painting operations.

Production painting operations for decorative or protective coatings are commonly conducted in spraybooths. The spraybooth is a chamber designed so that air supplied to one side or the top of the booth flows smoothly over the goods to be painted and is exhausted out the opposite side or bottom of the enclosure. This air flow carries excess paint spray away from the goods so that it cannot cause defects, and away from the equipment in the spraybooth to avoid fouling it with accumulated paint. In addition, a spraybooth will commonly have openings called "silhouettes" at either end to permit goods to be conveyed through the booth without a need to open or close doors as production proceeds. It is common to cause air to flow through such silhouettes in a chosen direction at a controlled velocity by carefully adjusting the supply and exhaust air volumes to the spraybooth. The air flow through the silhouette may serve to contain overspray inside the spraybooth if flowing in; or may serve to keep dirt or contamination outside the spraybooth if flowing out. As spraybooths are commonly divided into many sections for different process steps separated by silhouettes, the air balance of a spraybooth may be very complex.

Precise control over the static pressure inside a spraybooth enclosure with respect to the area around it is vital to the control of the painting process. If the booth is positive to the surrounding area, paint overspray will be blown out of the booth enclosure. If the booth is too negative, dirty air may be pulled into the booth and contaminate the product. In most cases, static pressure control is used to maintain or control flow velocities through silhouettes or other openings in the booth enclosure. However, pressure imbalances may create undesirable air flow patterns inside the booth which adversely affect product quality, system transfer efficiency, or worker safety. Also, since booths are commonly connected to other equipment, such as ovens and sanding operations, by enclosed tunnels, an imbalance in the spraybooth pressure may cause undesirable air balance changes in other equipment located distantly but connected to the booth by the tunnel system or other enclosures.

Conventionally, spraybooth air balance has been controlled manually or with static pressure controllers. Manual control is inefficient because the systems are large and complex and balance adjustments are required frequently. Automatic static pressure control has also proven ineffective because the desired control point is at a very low pressure level, undetectable by most commercially practical instruments. In addition, momentary pressure surges from such events as doors opening or initiation or termination of equipment operation may send the few available sensors or controllers of adequate sensitivity into off-scale readings causing difficulties with control. Any sensor attached to a spraybooth is also likely to become fouled with paint overspray in the normal course of production or maintenance. Few sensors of adequate sensitivity can survive an encounter with wet paint and maintain their function or accuracy. Due to these problems, past attempts at automatic air balance control in painting systems have generally been inadequate.

While past attempts at automatic control have relied on pressure controllers or sensors, the actual objective is to accurately control and stabilize the air velocities passing through openings in the spraying enclosure or related equipment. Typically, the desired velocities are on the order of 25-150 feet per minute. Given the large size of the booth openings, the pressures required to generate these velocities are less than 0.001 inches of water column, often as low as 0.0001 inches of water column. Such low velocities may be easily measured with hot wire anemometers and other low velocity instruments. However, such instruments have been previously considered impractical because they are very sensitive to fouling by paint overspray, which is inexorably drawn through the instrument in the course of normal operation. In addition, most such instruments are not bi-directional devices. They read in only one direction, or read only absolute velocities without regard to the direction of the flow. It is also desireable and often necessary that the instrument be intrinsically safe; that is, it must employ components and wiring not capable of releasing sufficient electrical or thermal energy under normal or abnormal conditions to cause ignition of its environmental atmospheric mixture even when that mixture is composed of its most easily ignitable concentration. In paint spraybooth applications, an intrinsically safe instrument must be rated for use in a Class I, Division I, Group D explosive environment.

Thus, a need exists for a useful instrument adaptable to paint finishing systems and which is capable of balancing air flows under the following conditions: (1) read from 20-150 fpm reliably and repeatably; (2) be resistant to momentary pressure pulses; (3) indicate the direction of flow; (4) resist paint overspray or other contamination; and (5) be intrinsically safe.

SUMMARY OF THE INVENTION

The present invention is directed to a novel and unique apparatus for use in measuring fluid flow across a boundary. The invention finds particularly advantageous use in the environment of paint spraybooth facilities, and is disclosed in its preferred embodiments within such an environment. Nevertheless, those skilled in the art will appreciate that the invention is not so limited, but rather extends to other environments where it is desireable to control fluid flow through relatively large openings and in which paint, dirt or other contaminants and explosive atmospheric mixtures may be encountered.

In accordance with the present invention, the fluid flow measuring apparatus comprises a conduit, supply means for control air and two air flow sensors. The conduit is positioned so that it bridges or extends across the boundary or structure over which the fluid flow balance is to be controlled. Thus, the conduit is positioned so that its open ends are located on opposite sides of the boundary; one open end being located in a first region or area, and the other open end being located in a second region or area separated from the first by the boundary. The supply means introduces a predetermined volume of control fluid into the conduit through a charging port located at a point intermediate to the conduit's open ends so that control fluid will flow through the conduit from the charging port in opposite directions and discharge from the conduit through both ends. The fluid flow control sensors are each mounted within the conduit on opposite sides of the charging port, so that each may sense variations in control fluid flow exiting at the ends of the conduit.

Of course, fluid flow across the boundary is dependent upon the differential in static pressure between the two regions separated by the boundary. So too, the magnitude of the control fluid flow from each end of the conduit depends upon the static pressure in each of the two regions. Thus, the static pressure differential in the two regions and the fluid flow across the boundary, may be determined simply by comparison of the control fluid flows passing each of the sensors within the conduit.

The invention is not limited, however, to simply measuring the fluid flow across the boundary. It also contemplates control of the fluid flow in response to the measured values. Moreover, the invention is not limited to flow measurement and control in two regions, but may be readily adapted to applications involving many different regions or enclosures.

It is therefore an object of the present invention to provide an improved apparatus to automatically measure and control the fluid flow across a boundary, particularly, where low flow rates on the order of from 20 to 150 feet per minute are encountered.

It is also an object of the present invention to provide an automated apparatus for the measurement and control of fluid flow across a boundary which is resistant to momentary pressure pulses which may occur in the regions separated by the boundary.

It is still a further object of the present invention to provide an automated apparatus for the measurement and control of fluid flow across a boundary in which the apparatus is capable of indicating the direction of fluid flow.

Still another object of the present invention is to provide an automated apparatus for the measurement and control of air flow between different enclosures in a paint spraybooth facility which is resistant to paint overspray or other contamination.

Another object of the present invention is to provide an automated apparatus for the measurement and control of fluid flow across a boundary in an explosive environment and in which the apparatus is intrinsically safe.

BRIEF DESCRIPTION OF THE DRAWINGS

The novel features of the invention are set forth in the appended claims. However, various preferred embodiments of the invention, together with further objects and attendant advantages, will be best understood by reference to the following description taken in connection with the accompanying drawings in which:

DETAILED DESCRIPTION OF THE PREFERRED EMBODIMENTS

Figure 1:
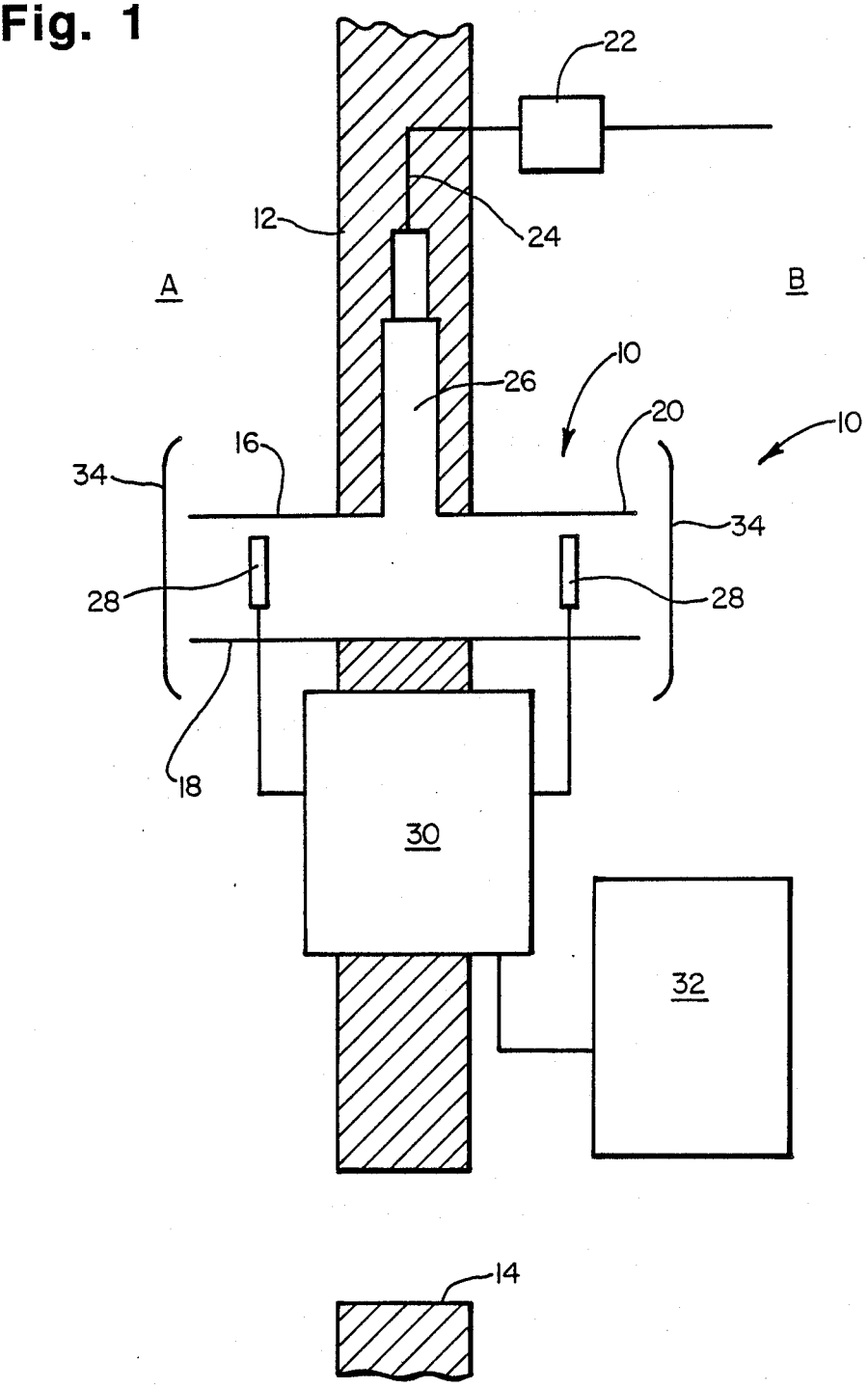
FIG. 1 is a diagrammatic view illustrating one embodiment of the present invention as used to measure and control fluid flow between two regions separated by a single boundary.

With reference to FIG. 1 the apparatus of the present invention, designated generally as 10, is shown positioned to bridge or extend across a boundary 12, separating two distinct regions, A and B respectively. The boundary 12 may be in the form of a wall, partition, tunnel or other physical structure typically found in paint spraybooth facilities or other industrial operations. Boundary 12 includes an opening or passageway 14, permitting fluid flow between regions A and B. The apparatus 10 includes a conduit 16 having an open end 18 which extends into region A and another open end 20 extending into region B. A supply means 22 provides a source of control fluid, such as pressurized air, to conduit 16 via line 24 and charging port 26. The charging port 26 is located at an intermediate point along the length of conduit 16 and thereby permits the control air, introduced into the conduit through port 26 to flow in opposite directions toward open ends 18 and 20. Air flow sensors 28 are mounted within conduit 16 on opposite sides of the charging port 26 and are thereby positioned in the paths of the air flow streams as they move toward ends 18 and 20 of conduit 16. Thus, the air flow velocity at each end of the conduit 16 is measured by the sensors or anemometers 28. The preferred type of anemometer is a heated surface anemometer, which may take the form of a hot wire or hot film anemometer. Other anemometers, such as laser or acoustic doppler anemometers or even vane anemometers, can be used. However, the hot wire anemometer is particularly preferred because it can be utilized with an intrinsically safe electrical system.

One advantage of the present invention is that it does permit the utilization of an intrinsically safe hot surface anemometer. In the past, most anemometers of this type have not been considered intrinsically safe since they must normally operate over a wide range of temperatures and velocities and therefore require too hot a surface generated by too high a current flow. Such current flows do not allow an intrinsically safe system. In the present invention, because both legs of the sensing instrument may be bridged together and are subjected to the same temperature, little or no temperature compensation is needed. Moreover, since the instrument is designed to work over a very narrow range of velocities, little scale is needed. Both these factors tend to lower the power requirements of the instrument, and therefore an intrinsically safe sensor may be easily designed utilizing either resistance element or thermistor type hot surface anemometers.

As noted earlier, the instrument 10 is capable of determining the direction of flow across boundary 12. The sensor 28 associated with the lower pressure region will always measure a higher control fluid velocity than will the sensor 28 associated with the higher pressure region. Thus, the direction of flow across the boundary can be determined simply by comparing the magnitude of the velocity signals generated by sensors 28.

The outputs of the two air flow sensors 28 may be connected in a bridge circuit 30 or may be kept separate for processing individually. The instrument may be used as a sensor only, or may be used in conjunction with a controller 32 to adjust the static pressure within regions A and or B, thereby controlling fluid flow through opening 14. In all of these embodiments the specific components and electronic circuitry to be employed may be selected from a wide variety well known and readily apparent to those of ordinary skill in the art.

Another important feature of the present invention is that it is self-purging. That is, the control air entering conduit 16 via charging port 26 maintains an air stream which continually discharges from ends 18 and 20 of conduit. In this way, no contaminants, and particularly airborne paint overspray, can enter the instrument to foul the anemometers 28. The control air flow volume may be regulated by a variety of means. These include a critical orifice, pressure regulator connected at an orifice, thermal flow mass controllers, and other flow control devices well known to those of ordinary skill in the art. A critical orifice is among the simplest and most reliable of such controllers and is the preferred structure to be employed in the context of the present invention. The orifice may be sized so that any pressure above its critical pressure results in the passage of a predetermined and constant air volume. Again, such critical orifice controllers are well known to those of ordinary skill in the art and may easily be adapted to supply control air to conduit 16.

It is also noteworthy that the use of hot wire anemometers for air flow sensors 28 will negate or minimize the influence of sudden or momentary pressure pulses in either region A or B. Thus, momentary changes in pressure differential across boundary 12 will not adversely affect the operation of the apparatus 10.

As illustrated in FIG. 1 it may also be desirable to mount baffles 34 at a location in front of the open ends 18 and 20 of conduit 16 in order to prevent accidental blockage of the open ends.

Figure 2:
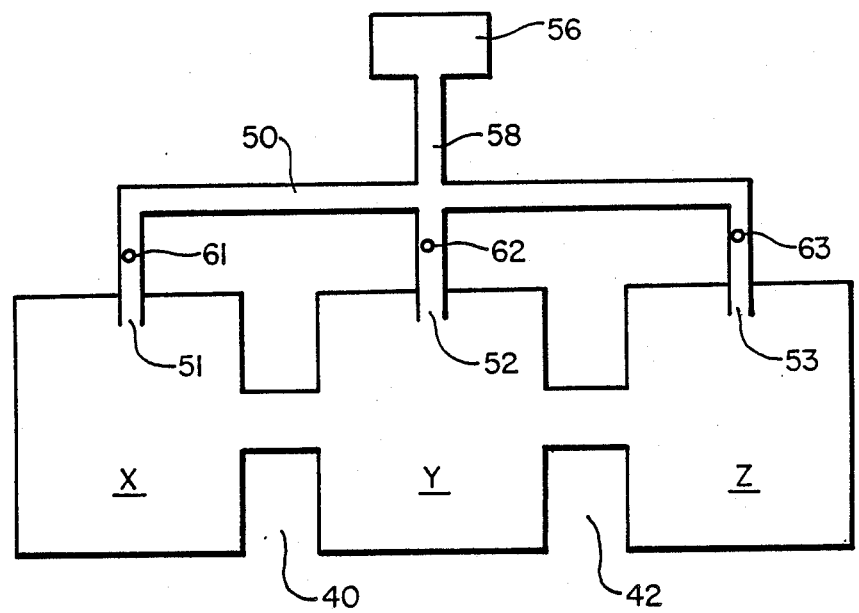
FIG. 2 is another diagrammatic view illustrating the apparatus of the present invention when used to measure and control fluid flow rates through and between a plurality of regions.

With reference now to FIG. 2, the apparatus of the present invention is illustrated in an application where fluid flow between three regions X, Y and Z is being controlled. This embodiment is presented in order to illustrate that the apparatus of the present invention can be used to control fluid flow through a plurality of different regions. In FIG. 2, regions X and Y are separated by boundary 40 and regions Y and Z ar separated by boundary 42. The apparatus for measuring fluid flow between these respective regions includes a conduit 50 having open ends 51, 52 and 53 located within regions X, Y and Z, respectively. Control air is supplied to conduit 50 via supply means 56 and charging port 58. This control air, in turn, passes through conduit 50 to each open end and across sensors 61, 62 and 63. In all other respects the function and operation of the apparatus illustrated in FIG. 2 is the same as that illustrated in FIG. 1.

It will be appreciated by those of ordinary skill in the art that various modifications and changes can be made to the illustrated embodiments without departing from the spirit of the present invention. All such modifications and changes are intended to be covered by the appended claims.

We claim:

1. In a paint spraybooth facility including a spraybooth enclosure wall having at least one opening creating an air flow passageway between the inside and the outside of said spraybooth, an apparatus for measuring an air flow through said opening of between 20 and 150 feet per minute, comprising: a conduit positioned to bridge said enclosure wall and having two open ends, one of said open ends being located on one side of said enclosure wall and the second of said open ends being located on the other side of said enclosure wall; supply means for introducing a predetermined flow of control air into said conduit at a point intermediate said two ends; and two intrinsically safe air flow sensors mounted within said conduit on opposite sides of said intermediate point, said air flow sensors including means for generating at least one output signal responsive to the fluid flow through said passageway.

2. The apparatus of claim 1 wherein said supply means is designed to keep the sensors at approximately the same temperature.

3. The apparatus of claim 2 wherein each said sensor is a hot surface amenometer, and the outputs of said anemometers are electrically connected.

4. The apparatus of claim 2 wherein said apparatus is selfpurging.

5. The apparatus of claim 2 wherein said sensors will negate or minimize the influence of sudden pressure pulses in the environment of said spraybooth facility.

* * * * *